(12) United States Patent
Link et al.

(10) Patent No.: US 10,594,106 B2
(45) Date of Patent: Mar. 17, 2020

(54) SYMMETRIC OUT-OF-PLANE CONFIGURATIONS OF DIFFRACTIVE GRATINGS AND METHOD

(71) Applicant: Lawrence Livermore National Security, LLC, Livermore, CA (US)

(72) Inventors: Emily F. Link, Livermore, CA (US); David A. Alessi, Livermore, CA (US); Leon C. Haefner, Oakland, CA (US); Jerald A. Britten, Clayton, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 16/122,769

(22) Filed: Sep. 5, 2018

(65) Prior Publication Data
US 2019/0074653 A1    Mar. 7, 2019

Related U.S. Application Data

(60) Provisional application No. 62/555,596, filed on Sep. 7, 2017.

(51) Int. Cl.
*H01S 3/00* (2006.01)
*H01S 3/23* (2006.01)

(52) U.S. Cl.
CPC .......... *H01S 3/0057* (2013.01); *H01S 3/2325* (2013.01); *H01S 3/005* (2013.01)

(58) Field of Classification Search
CPC .. H01S 3/2325; H01S 3/0057; H01S 5/18386; H01S 3/0812; H01S 5/1243; H01S 5/1212
USPC ............................................................ 372/25
See application file for complete search history.

(56) References Cited

U.S. PATENT DOCUMENTS

| | | | | | |
|---|---|---|---|---|---|
| 4,490,021 | A | * | 12/1984 | Moya | H01S 3/0812 359/572 |
| 4,746,193 | A | * | 5/1988 | Heritage | H01S 3/0057 359/559 |
| 5,263,039 | A | * | 11/1993 | Skupsky | H01S 3/0057 372/101 |
| 6,081,543 | A | * | 6/2000 | Liu | H01S 3/0057 372/102 |
| 2007/0127123 | A1 | * | 6/2007 | Brown | G02B 27/1006 359/556 |
| 2011/0026105 | A1 | * | 2/2011 | Bayramian | H01S 3/0057 359/337.5 |

OTHER PUBLICATIONS

Frassetto et al., "Grating Configurations to Compress Extreme-Ultraviolet Ultrashort Pulses," Appl. Optics, vol. 54, No. 26, 2015, pp. 7985-7992.
Chekhlov et al., "Compressor Design for the Astra Gemini Project," Laser Science and Development, Central Laser Facility Annual Report 2004/2005, pp. 219-220.

(Continued)

*Primary Examiner* — Tuan N Nguyen
(74) *Attorney, Agent, or Firm* — John P. Wooldridge (57) ABSTRACT

Grating pair architectures used for short pulse stretching, compression and pulse shaping are enabled for use at arbitrary use angles without inducing spatial frequency chirp. These symmetric out-of-plane diffractive grating arrangements are capable of adding or removing spatial, temporal and angular chirp at any incidence angle.

20 Claims, 7 Drawing Sheets

(56) References Cited

OTHER PUBLICATIONS

Zhang et al., "Vertical Chirp in Grating Pair Stretcher and Compressor," Appl. Phys. Lett., vol. 67, No. 2, 1995, pp. 176-178.
International Search Report and Written Opinion for PCT/US2018/049615 corresponding to U.S. Appl. No. 16/122,769, 8 pages.

* cited by examiner

SYMMETRIC OUT-OF-PLANE CONFIGURATIONS OF DIFFRACTIVE GRATINGS AND METHOD

CROSS-REFERENCE TO RELATED APPLICATIONS

This application claims the benefit of U.S. Provisional Patent Application No. 62/555,596 titled "Symmetric Out-Of-Plane Arrangement for Diffractive Gratings for Adding or Removing Spatial, Temporal, and Angular Chirp at any Incidence Angle," filed Sep. 7, 2017, incorporated herein by reference.

STATEMENT AS TO RIGHTS TO INVENTIONS MADE UNDER FEDERALLY SPONSORED RESEARCH OR DEVELOPMENT

The United States Government has rights in this invention pursuant to Contract No. DE-AC52-07NA27344 between the United States Department of Energy and Lawrence Livermore National Security, LLC, for the operation of Lawrence Livermore National Laboratory.

BACKGROUND

Field

The present technology relates to grating pair architectures used for short pulse stretching, compression, and pulse shaping, and more specifically, it relates to technology for enabling these architectures at arbitrary use angles without inducing spatial frequency chirp.

Description of Related Art

Current laser Technology is capable of producing terawatt ($10^{12}$ W) to petawatt class ($10^{15}$ W) lasers by using ultra-short pulses. These high peak power lasers have demonstrated success for basic energy science with high temporal resolution, advanced machining, and the production of secondary sources for x-ray imaging, defense, and medical applications. By the end of 2017, there will be over 100 petawatt-class lasers in operation worldwide. In addition to ultra-short pulses (of a few 10's to 100 fs), many applications also require higher repetition frequencies for high average power. Operation of high peak power beamlines at high average power will require the reduction of losses to reduce heating related limitations.

A major source of loss in high peak-power lasers is the poor efficiency of pulse compression. Amplification of ultra-short pulses requires decreasing the peak intensity (energy per area per unit time) in the amplifying medium. To accomplish this, pairs of diffraction gratings are used to introduce a wavelength-dependent delay, increasing the duration of the pulse in a way that lowers the peak intensity in the amplifiers and can be reversed later. After amplification is achieved it is necessary to re-compress the pulse using additional pairs of diffraction gratings. A typical compressor consists of either four reflective gratings or two gratings with a retro-reflecting mirror to send the laser through a second pass. This pulse compression is well-documented, but strongly dependent on the efficiency of the gratings used. Alternative architectures using prisms or transmission gratings can be used, but purely reflective geometries produce the cleanest pulses for high energy lasers and are less susceptible to compression artifacts caused by nonlinear propagation effects from material transmission.

The current technology, for the compression of pulses to sub-150 fs durations, is based on gold reflective gratings with a maximum diffraction efficiency of 94%. After diffracting four times from these gold gratings the total compressor transmission is maximally 78%. In practice, compressor transmissions are closer to 70-75%. This high loss is a major limitation on high energy ultra-short lasers, drastically increasing the cost per joule. To preserve diffraction efficiency over a broader bandwidth, it may be desired to use the gratings at a specific use angle. For instance, multi-layer dielectric gratings capable of producing >90% compressor transmission must be used near a Littrow-angle configuration. (Littrow is the angle at which an incoming ray is diffracted back to its point of origin.) Deviations away from Littrow angle produce a rapid decrease in bandwidth.

To pass beams in and out of a reflective grating compressor it is necessary to tilt the gratings. Depending on application, it is sometimes necessary to set the in-plane incidence angle to a specific value (e.g., Littrow), potentially necessitating an out-of-plane tilt to facilitate transporting the beam into the optical system. This out-of-plane incidence angle gives rise to conical diffraction. Previous implementations of parallel grating compressors utilizing this out-of-plane incidence angle have used a single plane retroreflecting mirror to send the beam through a second pass through the compressor and produce separation between the input and output beams or used a single pair of gratings without attempting to compensate for spatial chirp, or used a two-element roof mirror assembly with small beams and small chirp factors less sensitive to spatial chirp effects. Because each color follows a slightly different angle through its second pass of the compressor the compensation of spatial chirp is incomplete.

SUMMARY

The technology provides a symmetric out-of-plane arrangement for diffractive gratings for adding or removing spatial, temporal, and angular chirp at any incidence angle. The new pulse compressor architecture enables full compensation of spatial chirp at arbitrary use angle. This allows separation of input and output beams without loss of spatial or temporal quality. The design was reduced to practice with angularly-sensitive MLD gratings to produce a high efficiency, broadband, reflective pulse compressor in a near-Littrow angle configuration and demonstrated correction of spatial and angular chirp which arises from off-plane diffraction. This development has potential to impact the $1.4B ultrafast laser market.

Uses of the technology include stretching and compression of laser pulses, stretching and compression of ultra-short laser pulses, compression of moderate to high energy ultra-short pulse laser pulses, compression of high average power ultra-short laser pulses, pulse shaping, terawatt lasers, petawatt lasers, pulse stretching and compression, spectral filtering and conical diffraction-based pulse compression or stretching.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE TECHNOLOGY

Figure 1:
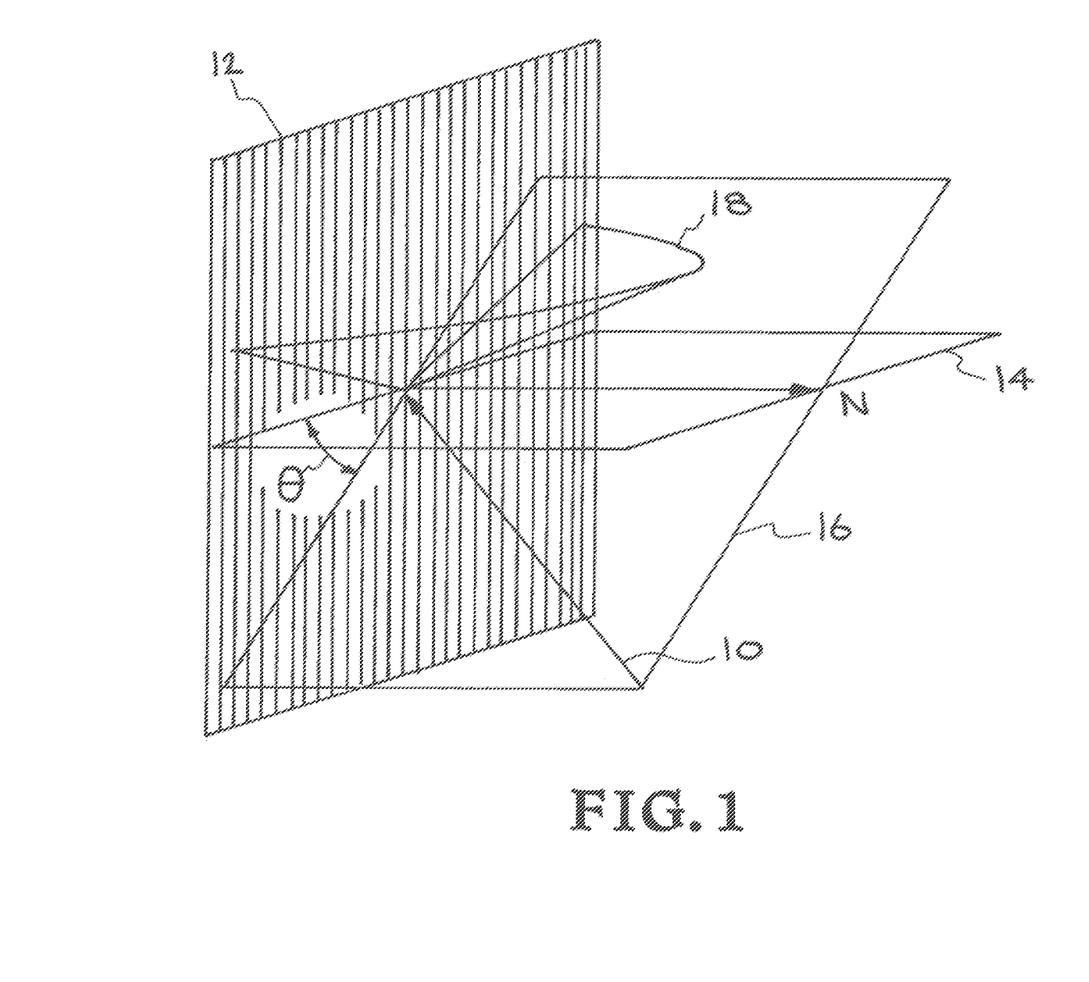
FIG. 1 is a diagram of out-of-plane diffraction of a laser beam incident on a grating.

In order to completely compensate the spatial chirp introduced by the first pair of gratings it is necessary for the beam to traverse a second pair of gratings in a fully symmetric mirror image configuration. This symmetry requirement is more restrictive when incidence angles outside of the grating normal plane are used, due to conical diffraction, as illustrated in FIG. 1. The symmetry can be fulfilled through several different configurations. FIG. 1 is a diagram of out-of-plane diffraction of a laser beam incident on a grating. The industry standard is to operate with incident and diffracted beams lying within a plane perpendicular to the grating grooves (14). In this case, a broadband laser pulse 10 is incident to the grating 12 in a plane 16 which is out of plane by angle theta ($\theta$). The colors are diffracted out of the plane in the cone 18 shown.

Figure 2:
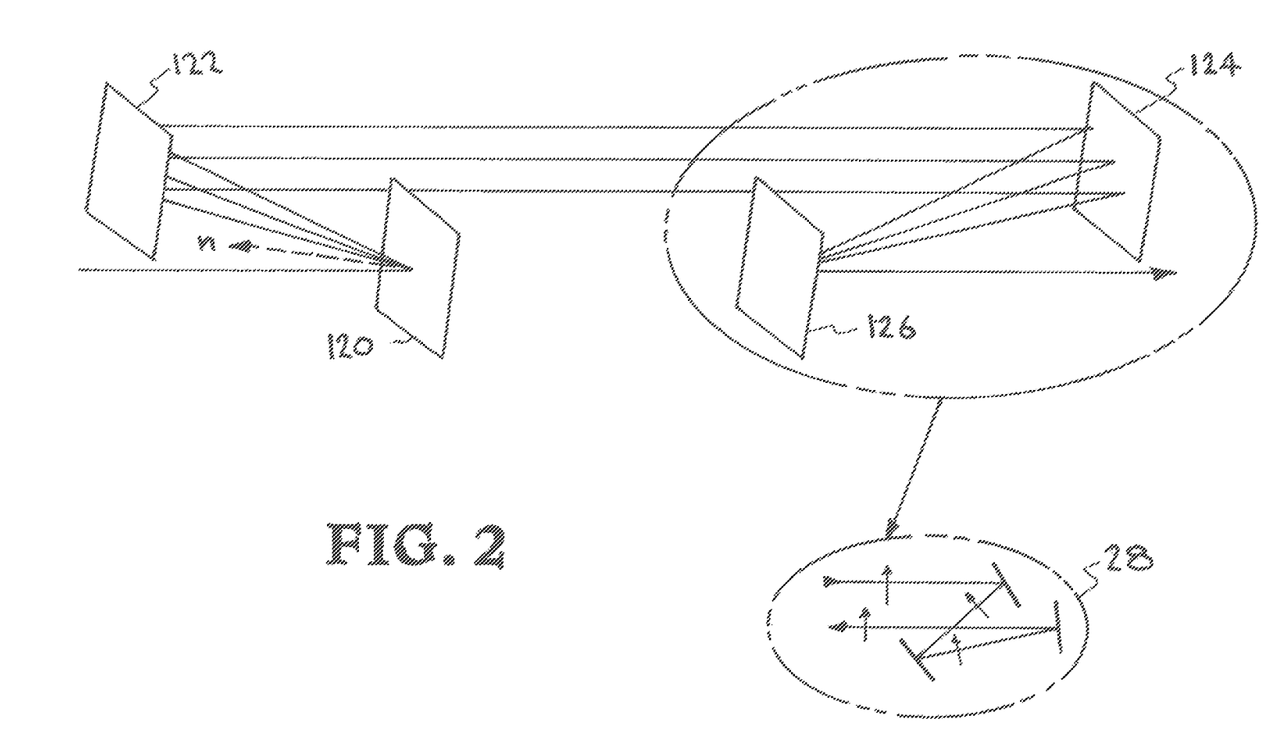
FIG. 2 is a diagram of a symmetric 4-grating configuration for arbitrary-angle pulse compression.

Two examples of sufficient configurations are displayed in FIG. 2. The beam in the symmetric 4-grating configuration in FIG. 2 is equivalent to the two-grating, double-passed configuration with a compound retro-reflector in the inset in FIG. 2 because the beam traces the same path back through its second pass. The achievement of a symmetric mirror image configuration is necessary to eliminate spatial chirp in the grating compressor system. As in a more conventional grating system, angular chirp effects are compensated by having parallel plane gratings, regardless of incidence angle. Thus, FIG. 2 is a diagram of a symmetric 4-grating configuration for arbitrary-angle pulse compression. In this configuration, all spatial chirp can be successfully compensated by using a symmetric mirror image of the first grating pair. The first grating pair 120 and 122 disperses the wavelengths of the input pulse. The second grating pair 124 and 126 is a symmetric mirror image of the first grating pair. An example of an alternate scheme that also meets the required symmetry can be achieved by replacing grating pair 124 and 126 a retro-reflector 128. In this case a three-mirror retro-reflector design is used to send the beam back for a second pass through the first pair of gratings with a vertical displacement.

Figure 3:
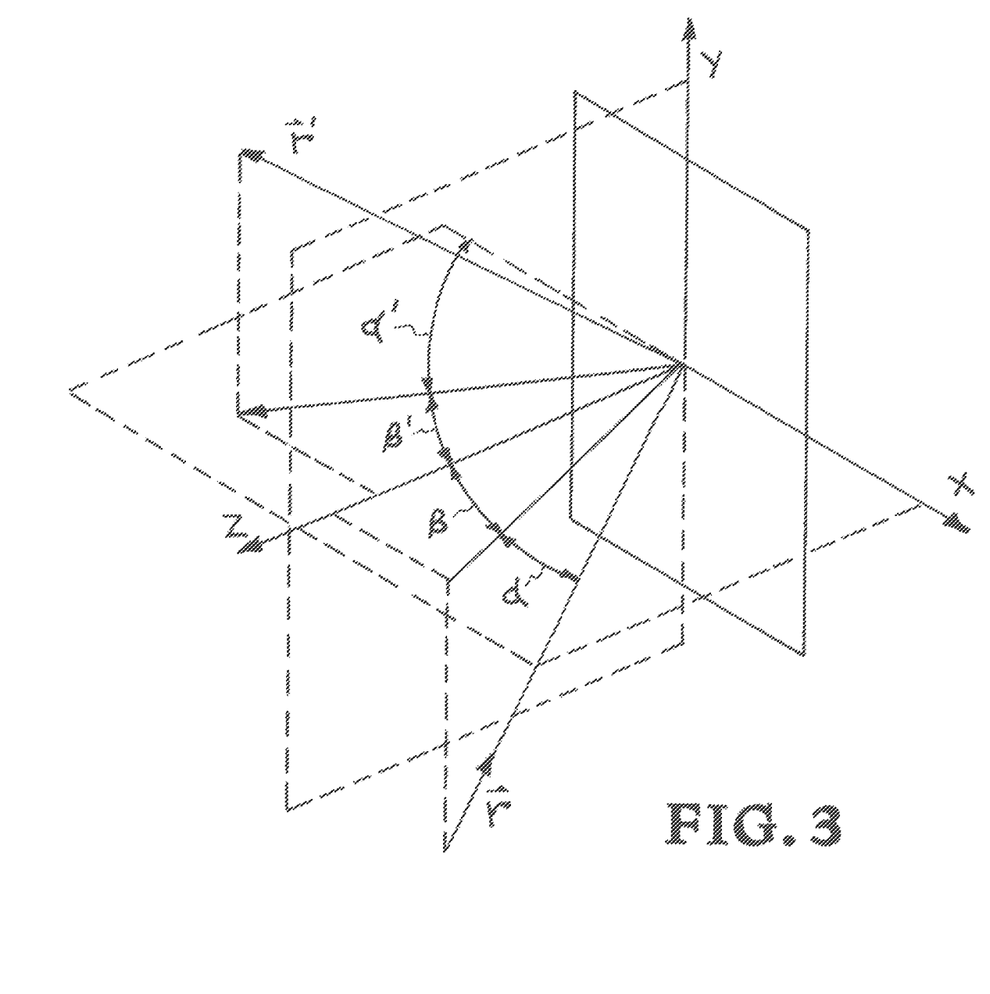
FIG. 3 is a diagram illustrating angle conventions, as used for calculations of path-length through the out of-plane compressor geometry.

In the out-of-plane configuration, the dispersion imposed on the input beam is different than that imposed by purely in-plane configurations. This is because the path traversed by each frequency is different in an out-of-plane configuration that in the traditional case. This path traversed during each pass through the grating pair is described by:

$$p = \frac{d \cdot (1 + \sin^2\alpha + \cos\theta \cdot \cos^2\alpha)}{\cos\alpha \cdot \cos(\beta - \theta)},$$

where $$\theta = \beta - \sin^{-1}\left(\frac{\lambda}{G \cdot \cos\alpha} - \sin\beta\right),$$

d is the perpendicular separation between the gratings, G is the distance between rulings on the gratings, $\lambda$ is the wavelength, $\alpha$ is angle between the incoming ray and its projection in the plane of the grating normal, and $\beta$ is the angle between the grating normal and the projection of the incoming ray into the grating normal plane. The relationship between the angles $\alpha$ and $\beta$ is illustrated in FIG. 3.

FIG. 3 is a diagram illustrating angle conventions, as used for calculations of path-length through the out of-plane compressor geometry. The z-axis is the grating normal, the y-axis is defined as parallel to the grooves of the grating, and the x-axis is perpendicular to both the normal and the grating grooves. The grating normal plane is defined as the xz plane. The out-of-plane angle, $\alpha$, is defined as the angle between the incoming beam vector and its projection in the grating normal plane. The in-plane angle, $\beta$, is defined as the angle between this projection and the z-axis.

As in the in-plane case the phase accrued by the beam as it traverses the grating pair is described by $\phi=\omega p/c$, where $\omega$ is the angular frequency and c is the speed of light. The diffraction orders can still be calculated by a Taylor expansion of the phase, as in the in-plane case. In the limit that the out-of-plane angle, $\alpha=0$, the phase derivatives yield the familiar in-plane case described by Treacy in 1.969.

Figure 4:
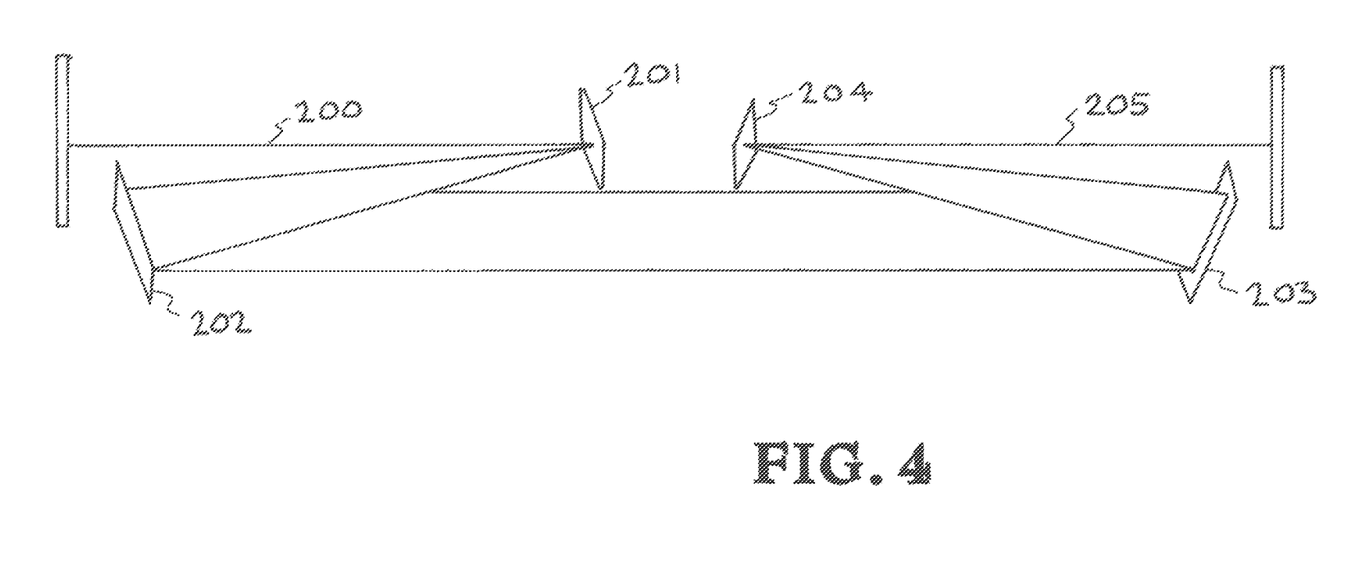
FIG. 4 is a ray-trace diagram of the as-built out-of-plane compressor arrangement which corrects off-plane diffraction aberrations.

We reduced the design to practice by studying a configuration to transport beams in and out of a Littrow-angle pulse compressor by rotating the diffraction plane 4 degrees out of the grating normal plane. If the gratings are parallel, no angular chirp issues are expected. We demonstrate zero adverse spatio-spectral effects by using four-gratings in a symmetric configuration. The Littrow out of plane compressor was reduced to practice using analytical calculations, ray-trace modeling, and through prototyping in the lab. FIG. 4 shows raytraced results of our design, utilizing 4 gratings operating at a 4 deg OOP angle that has no spatial or angular chirp. An initial proof-of principle experiment was performed with standard gold gratings to verify that the new geometry causes no unforeseen spatio-temporal effects. Once the validity of the design was verified experimentally a second proof-of-principle was performed with MLD gratings to achieve high throughput. The gratings used had a peak diffraction efficiency (DE) of 98%, and >97% diffraction efficiency for ±15 nm to either side of the center wavelength of 808 nm.

FIG. 4 is a ray-trace diagram of the as-built out-of-plane compressor arrangement which corrects off-plane diffraction aberrations. A single ray 200 with multiple colors is directed into the compressor at 4-degree OOP. The colors are diffracted by each of the 4 gratings 201-204 and end up overlapping in position and angle at the output 205. Each color travels a different distance in the compressor.

Figure 5:
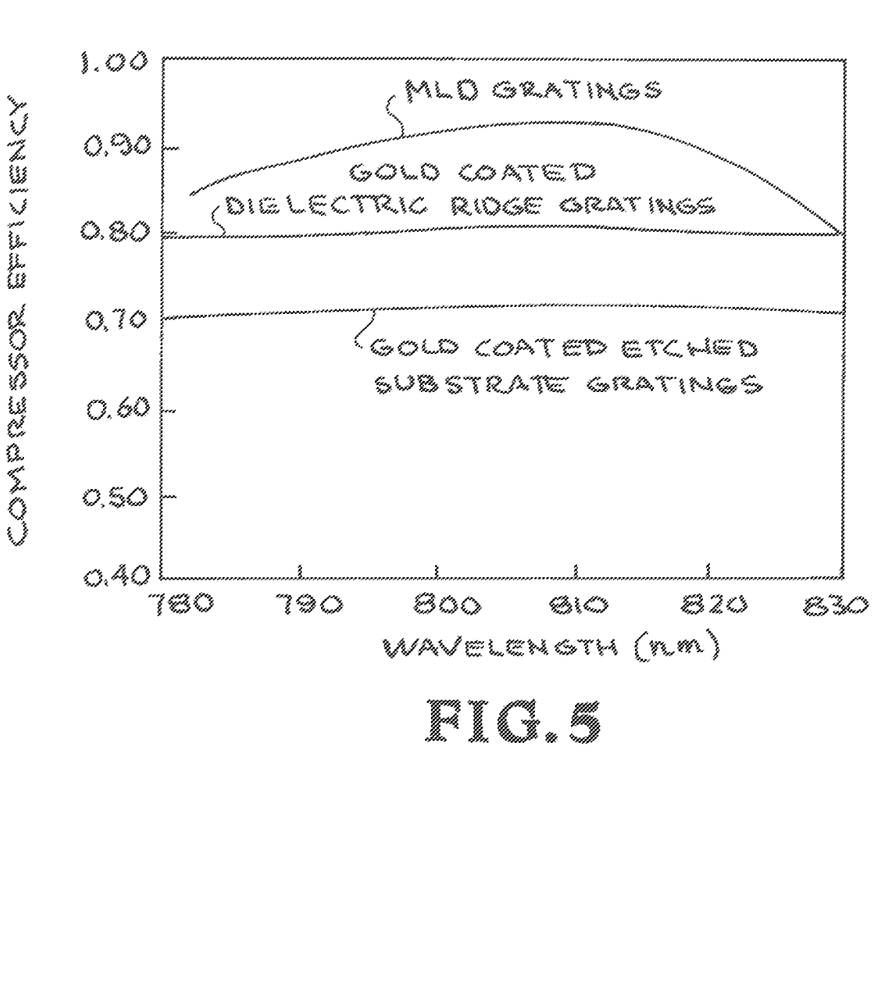
FIG. 5 shows compressor efficiency (from measurements) as a function of wavelength for various grating technologies.

The completed compressor with four MLD gratings produced 90% transmission over 50 nm (FIG. 5). This 50 nm maximum is limited by the size of the gratings used in the proof-of-principle. This is sufficient bandwidth to generate a 30-fs pulse. FIG. 5 shows compressor efficiency (from measurements) as a function of wavelength for various grating technologies. The high efficiency MLD compressor was obtained by using broad-bandwidth gratings in the OOP compressor built at Lawrence Livermore National Laboratory.

Figure 6:
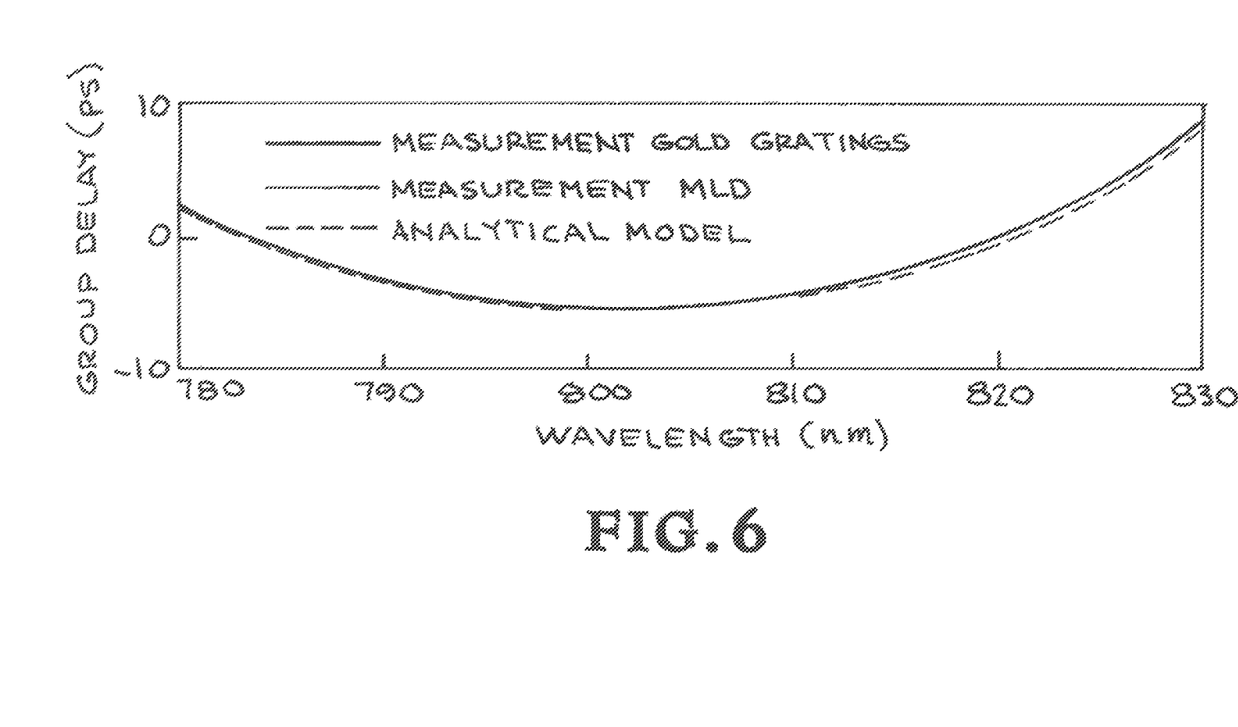
FIG. 6 shows agreement between calculated and measured group delay.

The spectral dispersion of the compressor design was investigated to understand how this compressor would operate within a chirped pulse amplification laser system. The dispersion modeling was validated by retro fitting an existing system with the OOP compressor and performing FROG measurements. FIG. 6 shows good agreement between the measured and calculated group delay. Thus, this geometry would not introduce any dispersion that would prevent the compression of sub-30 fs pulses. This confirms that the dispersion is well understood and that the dispersion from this design can be compensated to produce good pulses. Using the measured spectrum to model the expected pulse output we expect 30-35 fs pulses with the current grating design.

Figure 7A:
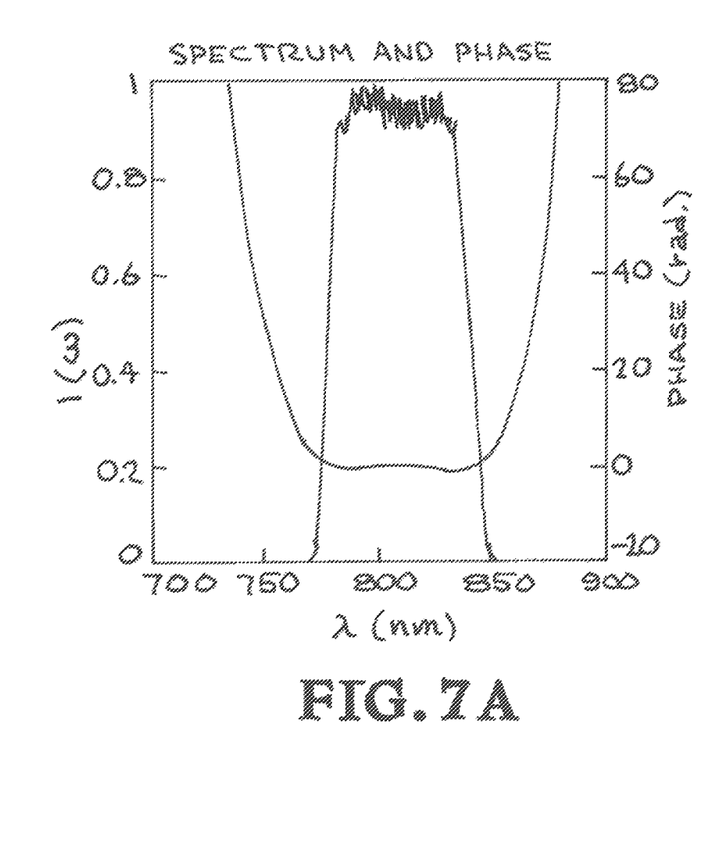
FIG. 7A shows the measured spectral response from the reduction to practice of the out-of-plane compressor with MLD gratings.

FIG. 7A shows the measured spectral response from the reduction to practice of the out-of-plane compressor with MLD gratings. The right axis shows the spectral phase calculated for the demonstrated compressor with a dispersion-matched stretcher.

Figure 7B:
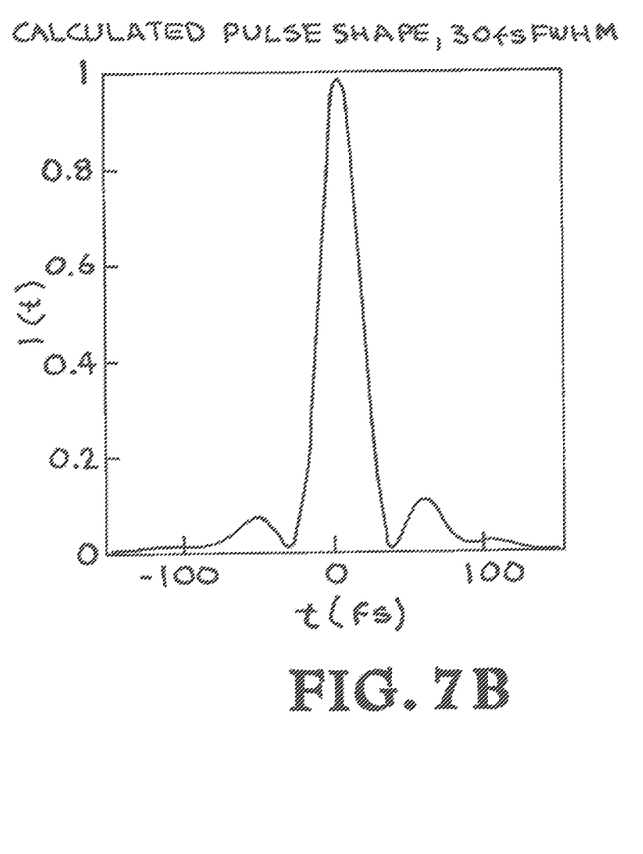
FIG. 7B shows the calculated temporal pulse shape for the spectrum and phase in FIG. 7A.

FIG. 7B shows the calculated temporal pulse shape for the spectrum and phase in FIG. 7A.

With more optimization of the grating design and larger gratings the new compressor should be able to scale to produce 92% transmission over a broader bandwidth. A 90% compressor throughput measured with MLD gratings in our Near-Littrow pulse compressor represents a roughly 20% reduction in the cost per joule for petawatt-class lasers. This significant increase in efficiency, along with increased average power handling capability and lifetime would be of great interest of the 100 PW-class systems that are planned to be operational by 2017 as well as the $1.4B ultrafast laser market.

Broadly, this writing discloses at least the following.

Grating pair architectures used for short pulse stretching, compression and pulse shaping are enabled for use at arbitrary use angles without inducing spatial frequency chirp. These symmetric out-of-plane diffractive grating arrangements are capable of adding or removing spatial, temporal and angular chirp at any incidence angle.

This writing also presents at least the following Concepts.

Concepts:

1. A symmetric out-of-plane diffractive grating apparatus, comprising:

a first grating pair comprising a first reflection grating and a second reflection grating, wherein said first reflection grating has a first plane defined as the plane that is both perpendicular to the grooves of said first reflection grating and includes the normal of said first reflection grating and wherein said second reflection grating is parallel to said first reflection grating;

a fully symmetric mirror image configuration of said first grating pair; and means configured to direct a pulse of electromagnetic radiation outside of said first plane and onto said first reflection grating, wherein said pulse will propagate from said first reflection grating and then onto said second reflection grating and then through said fully symmetric mirror image configuration to produce an output pulse.

2. The apparatus of concepts 1 and 6-10, wherein said fully symmetric mirror image configuration comprises a retroreflector combined with said first grating pair, wherein said pulse will propagate from said second reflection grating and be reflected from said retroreflector and then will be reflected from said second reflection grating and then will be reflected from said first reflection grating to produce said output pulse.

3. The apparatus of concept 2, wherein said retroreflector comprises a single component retroreflector or a plurality of separate mirrors.

4. The apparatus of concept 2, wherein said retroreflector sends said input pulse back through its original optical path without angular deviation or changing the spatial distribution of the dispersed light.

5. The apparatus of concepts 1 and 6-10, wherein said fully symmetric mirror image configuration comprises a third reflection grating and a fourth reflection grating, wherein said third reflection grating is parallel with said fourth reflection grating, wherein said pulse will propagate from said second reflection grating and will be reflected from said third reflection grating and then will be reflected from said fourth reflection grating.

6. The apparatus of concepts 1, 2, 5 and 7-10, wherein said grating pair together with said fully symmetric mirror image configuration are configured to improve the spectral bandwidth of said output pulse relative to said input pulse.

7. The apparatus of concepts 1, 2, 5, 6 and 8-10, wherein said means configured to direct the pulse of electromagnetic radiation is configured to direct the pulse of electromagnetic radiation onto said first reflection grating at the Littrow angle.

8. The apparatus of concepts 1, 2, 5-7, 9 and 10, wherein said first grating pair together with said fully symmetric mirror image configuration have a configuration selected from the group consisting of a short pulse stretcher, a compressor and a pulse shaper.

9. The apparatus of concepts 1, 2, 5-8 and 10, wherein relative to said input pulse, said output pulse includes at least one added type of frequency chirp selected from the group consisting of spatial chirp, temporal chirp and angular chirp.

10. The apparatus of concepts 1, 2 and 5-9, wherein relative to said input pulse, said output pulse has at least one less type of frequency chirp selected from the group consisting of spatial chirp, temporal chirp and angular chirp.

11. A symmetric out-of-plane diffractive grating method, comprising:

providing a first grating pair comprising a first reflection grating and a second reflection grating, wherein said first reflection grating has a first plane defined as the plane that is both perpendicular to the grooves of said first reflection grating and includes the normal of said first reflection grating and wherein said second reflection grating is parallel to said first reflection grating;

providing a fully symmetric mirror image configuration of said first grating pair; and directing an input pulse of electromagnetic radiation outside of said first plane and onto said first reflection grating such that said pulse will propagate from said first reflection grating and then onto said second reflection grating and then through said fully symmetric mirror image configuration to produce an output pulse.

12. The method of concepts 11 and 16-20, wherein said fully symmetric mirror image configuration comprises a retroreflector combined with said first grating pair, wherein said input pulse will propagate from said second reflection grating and be reflected from said retroreflector and then will be reflected from said second reflection grating and then will be reflected from said first reflection grating to produce said output pulse.

13. The method of concept 12, wherein said retroreflector comprises a single component retroreflector or a plurality of separate mirrors.

14. The method of concept 12, wherein said retroreflector sends said input pulse back through its original optical path without angular deviation or changing the spatial distribution of the dispersed light.

15. The method of concepts 11 and 16-20, wherein said fully symmetric mirror image configuration comprises a third reflection grating and a fourth reflection grating, wherein said third reflection grating is parallel with said fourth reflection grating, wherein said input pulse will propagate from said second reflection grating and will be reflected from said third reflection grating and then will be reflected from said fourth reflection grating.

16. The method of concepts 11, 12, 15 and 17-20, wherein the spectral bandwidth of said output pulse will be improved relative to said input pulse.

17. The method of concepts 11, 12, 15, 16 and 18-20, wherein the step of directing said input pulse includes directing said impulse pulse onto said first reflection grating at the Littrow angle.

18. The method of concepts 11, 12, 15-17 and 20, wherein said first grating pair together with said fully symmetric mirror image configuration have a configuration selected from the group consisting of a short pulse stretcher, a compressor and a pulse shaper.

19. The method of concepts 11, 12, 15-18 and 20, further comprising adding to said output pulse at least one type of frequency chirp selected from the group consisting of spatial chirp, temporal chirp and angular chirp.

20. The method of concepts 11, 12 and 15-19, further comprising removing from said output pulse at least one type of frequency chirp selected from the group consisting of spatial chirp, temporal chirp and angular chirp.

All elements, parts and steps described herein are preferably included. It is to be understood that any of these elements, parts and steps may be replaced by other elements, parts and steps or deleted altogether as will be obvious to those skilled in the art.

The foregoing description has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

We claim:

1. An apparatus, comprising:
   a first grating pair comprising a first reflection grating and a second reflection grating, wherein said first reflection grating has a first plane defined as the plane that is both perpendicular to the grooves of said first reflection grating and includes the normal of said first reflection grating and wherein said second reflection grating is parallel to said first reflection grating;
   a fully symmetric mirror image configuration of said first grating pair; and
   means configured to direct an input beam of electromagnetic radiation outside of said first plane and onto said first reflection grating to produce a first diffracted beam that is conically diffracted, wherein said first diffracted beam will propagate from said first reflection grating and then onto said second reflection grating, wherein said second reflection grating comprises a line spacing configured to diffract said first diffracted beam to produce a second diffracted beam that is collimated, wherein said second diffracted beam has more spatial chirp than said input beam, wherein said second reflection grating is configured to direct said second diffracted beam into said fully symmetric mirror image configuration of said first grating pair to produce an output beam having less spatial chirp than said second diffracted beam.

2. The apparatus of claim 1, wherein said fully symmetric mirror image configuration comprises a retroreflector operatively combined with said first grating pair, wherein said second diffracted beam will propagate from said second reflection grating and be reflected from said retroreflector to produce a reflected beam which is directed back onto said second reflection grating, wherein said second reflection grating will diffract said reflected beam to produce a third diffracted beam directed at said first reflection grating, wherein said third diffracted beam will be diffracted from said first reflection grating to produce said output beam.

3. The apparatus of claim 2, wherein said retroreflector comprises a single component retroreflector or a plurality of separate mirrors.

4. The apparatus of claim 2, wherein said retroreflector comprises a configuration that directs said reflected beam back to said second reflection grating through the original optical path, but in the opposite direction as that propagated by said second diffracted beam from said second reflection grating to said retroreflector, wherein said reflected beam propagates onto said second reflection grating without angular deviation or changing the spatial distribution of the dispersed light relative to said second diffracted beam.

5. The apparatus of claim 1, wherein said fully symmetric mirror image configuration comprises a third reflection grating and a fourth reflection grating, wherein said third reflection grating is parallel with said fourth reflection grating, wherein said second diffracted beam will propagate from said second reflection grating to said third reflection grating and will be diffracted from said third reflection grating to produce a third diffracted beam directed at said fourth reflection grating, wherein said third diffracted beam will be diffracted from said fourth reflection grating to produce said output beam.

6. The apparatus of claim 1, wherein said first grating pair together with said fully symmetric mirror image configuration are configured to improve the spectral bandwidth of said output beam relative to said input beam.

7. The apparatus of claim 1, wherein said means is configured to direct said input beam onto said first reflection grating at the Littrow angle.

8. The apparatus of claim 1, wherein said first grating pair together with said fully symmetric mirror image configuration have a configuration selected from the group consisting of a short pulse stretcher, a compressor and a pulse shaper.

9. The apparatus of claim 1, wherein relative to said input beam, said output beam includes at least one added type of frequency chirp selected from the group consisting of spatial chirp, temporal chirp and angular chirp.

10. The apparatus of claim 1, wherein relative to said input beam said output beam has at least one less type of frequency chirp selected from the group consisting of spatial chirp, temporal chirp and angular chirp.

11. A method, comprising:
   providing a first grating pair comprising a first reflection grating and a second reflection grating, wherein said first reflection grating has a first plane defined as the plane that is both perpendicular to the grooves of said first reflection grating and includes the normal of said first reflection grating and wherein said second reflection grating is parallel to said first reflection grating;

providing a fully symmetric mirror image configuration of said first grating pair; and directing an input beam of electromagnetic radiation outside of said first plane and onto said first reflection grating to produce a first diffracted beam that is conically diffracted, wherein said first diffracted beam will propagate from said first reflection grating and then onto said second reflection grating wherein said second reflection grating comprises a line spacing configured to diffract said first diffracted beam to produce a second diffracted beam that is collimated, wherein said second diffracted beam has more spatial chirp than said input beam, wherein said second reflection grating is configured to direct said second diffracted beam into said fully symmetric mirror image configuration of said first grating pair to produce an output beam having less spatial chirp than said second diffracted beam.

12. The method of claim 11, wherein said fully symmetric mirror image configuration comprises a retroreflector operatively combined with said first grating pair, wherein said second diffracted beam will propagate from said second reflection grating and be reflected from said retroreflector to produce a reflected beam which is directed back onto said second reflection grating, wherein said second reflection grating will diffract said reflected beam to produce a third diffracted beam directed at said first reflection grating, wherein said third diffracted beam will be diffracted from said first reflection grating to produce said output beam.

13. The method of claim 12, wherein said retroreflector comprises a single component retroreflector or a plurality of separate mirrors.

14. The method of claim 12, wherein said retroreflector comprises a configuration that directs said reflected beam back to said second reflection grating through the original optical path, but in the opposite direction as that propagated by said second diffracted beam from said second reflection grating to said retroreflector, wherein said reflected beam propagates onto said second reflection grating without angular deviation or changing the spatial distribution of the dispersed light relative to said second diffracted beam.

15. The method of claim 11, wherein said fully symmetric mirror image configuration comprises a third reflection grating and a fourth reflection grating, wherein said third reflection grating is parallel with said fourth reflection grating, wherein said second diffracted beam will propagate from said second reflection grating to said third reflection grating and will be diffracted from said third reflection grating to produce a third diffracted beam directed at said fourth reflection grating, wherein said third diffracted beam will be diffracted from said fourth reflection grating to produce said output beam.

16. The method of claim 11, wherein the spectral bandwidth of said output beam will be improved relative to said input beam.

17. The method of claim 11, wherein the step of directing said input beam includes directing said impulse beam onto said first reflection grating at the Littrow angle.

18. The method of claim 11, wherein said first grating pair together with said fully symmetric mirror image configuration have a configuration selected from the group consisting of a short pulse stretcher, a compressor and a pulse shaper.

19. The method of claim 11, wherein relative to said input beam, said output beam includes at least one added type of frequency chirp selected from the group consisting of spatial chirp, temporal chirp and angular chirp.

20. The method of claim 11, wherein relative to said input beam, said output beam includes at least one less type of frequency chirp selected from the group consisting of spatial chirp, temporal chirp and angular chirp.

* * * * *